United States Patent [19]

Möri et al.

[11] Patent Number: 4,459,737
[45] Date of Patent: Jul. 17, 1984

[54] MACHINE TOOL CONTAINING A MACHINE STAND FOR A WORK SPINDLE, A TOOL MAGAZINE AND A TOOL CHANGER ARRANGED THEREAT

[75] Inventors: Walter Möri, Kölliken; Hans Wernli, Oberhasli, both of Switzerland

[73] Assignee: Werkzeugmaschinenfabrik Oerlikon-Bührle AG, Zurich, Switzerland

[21] Appl. No.: 226,199

[22] Filed: Jan. 19, 1981

[30] Foreign Application Priority Data

Feb. 8, 1980 [CH] Switzerland ............... 1015/80

[51] Int. Cl.³ .................................. B23Q 3/157
[52] U.S. Cl. .................................. 29/568; 414/590; 414/735
[58] Field of Search ............... 29/568; 414/590, 735, 414/744 A; 187/19

[56] References Cited

U.S. PATENT DOCUMENTS 4,121,332 10/1978 Corsi ........................ 29/568
4,141,134 2/1979 Zettler et al. ............. 29/568

FOREIGN PATENT DOCUMENTS

| 2525212 | 12/1976 | Fed. Rep. of Germany ....... 29/568 |
| 1579286 | 8/1969 | France . |
| 2090161 | 1/1972 | France ................... 29/568 |
| 2303637 | 10/1976 | France ................... 29/568 |
| 135805 | 5/1979 | German Democratic Rep. ... 29/568 |
| 580469 | 10/1976 | Switzerland ............... 29/568 |
| 796365 | 6/1958 | United Kingdom ........... 187/19 |

Primary Examiner—Z. R. Bilinsky
Attorney, Agent, or Firm—Werner W. Kleeman

[57] ABSTRACT

With such machine tool the tool magazine is arranged independent of the machine stand. To obtain a tool changer having a simple course of movement which, additionally, does not transmit any vibrations from the tool magazine to the work spindle, the tool changer consists of a slide or carriage which is movably arranged upon a rail. A drive is provided for the carriage for moving the latter upon the rail. The rail is attached at the tool magazine and is extended in length by an extension piece which is arranged at the machine stand.

7 Claims, 4 Drawing Figures

MACHINE TOOL CONTAINING A MACHINE STAND FOR A WORK SPINDLE, A TOOL MAGAZINE AND A TOOL CHANGER ARRANGED THEREAT

BACKGROUND OF THE INVENTION

The present invention relates to a new and improved construction of a machine tool containing a machine stand for a work spindle, a tool magazine arranged separate from the machine stand and a tool changer arranged at the tool magazine.

From Swiss Patent No. 580,469 there is known to the art a machine tool of the type containing a machine stand for a work spindle and a tool magazine arranged separate from the machine stand, there also being provided a tool changer arranged at the tool magazine. This machine tool contains a tool changer which consists of a gripper rocker or balance arm which is pivotably mounted at the tool changer, a gripper arm which is pivotably mounted at the gripper rocker, and a gripper vane provided with gripper tongs or claws and rotatably mounted upon the gripper arm. Consequently, the tools both at the work spindle and also in the tool magazine are seized and released, as the case may be, by the gripper tongs with a movement which is perpendicular to the axis of the tool. A movement in the direction of the axis of the tool enables such to be withdrawn out of or inserted into the work spindle, as the case may be.

With this tool changer at least one of the pivotal elements, namely the gripper arm or gripper rocker, must possess a lever arm having a length which is directed towards the path of travel through which moves a tool from the tool magazine to the work spindle. Since there must be moved along with the tool also a gripper vane containing grippers, which collectively have a certain weight, it is possible for larger rotational moments or torques to appear at the pivot shafts or axes. These rotational moments are composed of braking and acceleration moments, which become increasingly greater as there is increased the speed with which the tool change operation is to be accomplished. Since such rotational moments finally are applied at the magazine stand it is necessary for the latter to be constructed so as to be particularly stable and must be braced at the ground. This is also so because the gripper rocker along with the gripper arm and the gripper vane, i.e., practically the entire tool changer must be moved back-and-forth in the direction of the axis of the work spindle, in order to withdraw or insert, as the case may be, a tool out of or into the work spindle.

Also in U.S. Pat. Nos. 3,242,568 and 3,256,600 there are known to the art further machine tools of the previously mentioned type. The provided tool changers are movably arranged in each instance upon a rail which must be secured both at the tool magazine and also at the machine stand.

The drawback of this arrangement resides in the fact that the machine stand, and thus also the tool spindle must be connected with the tool magazine. Therefore, vibrations can be transmitted from the tool magazine via the rail to the machine stand. This, in turn, impairs the working accuracy of the machine. This occurs that much more intensely the closer the tool magazine is arranged at the machine stand, in other words, the smaller the amount of space which is needed by the entire machine tool.

In French Patent No. 2,090,161, there is also disclosed a further machine tool of the previously mentioned type. With this machine tool the tool changer, which likewise contains a carriage which can travel upon a rail, only is attached at the machine stand.

In order to render possible a sufficient work accuracy it is necessary, with this construction of work spindle, to interrupt the machining work during such time as the tool changer, for instance, exchanges a tool in the magazine. This operation reduces the output of such machine.

Furthermore, the position momentarily assumed by the carriage along the rail influences the position of the work spindle, since the machine stand is loaded by a greater bending moment if, for instance, the carriage is dispositioned at the tool magazine.

In French Patent No. 2,303,637 there is taught to the art a machine tool wherein the tool changer, which likewise contains a carriage which can travel upon a rail, and the tool magazine are attached at the magazine stand.

The thus resulting drawbacks are the same as for the equipment design of the machine disclosed in the above-discussed French Patent No. 2,090,161. However, in this case, such disadvantages are more acute.

In French Patent No. 2,307,615 there is disclosed a further machine tool whose construction coincides with the construction of machine tool disclosed in the aforementioned French Patent No. 2,303,637. Hence, here also there prevail the same shortcomings.

Further equipment of the type under discussion has been disclosed in French Patent No. 1,579,286 and the German Patent Publication No. 2,525,212 which exemplify additional state-of-the-art structures.

SUMMARY OF THE INVENTION

Therefore, with the foregoing in mind it is a primary object of the present invention to provide a new and improved construction of a machine tool of the previously mentioned type, which contains a tool changer, and which avoids the aforementioned drawbacks, enables a simple course of movement of the tool changer and eliminates any damaging effect of the tool change operation upon the machining accuracy of the work spindle.

Another and more specific object of the invention aims at providing a machine tool of the previously mentioned type which enables designing the machine stand so as to be simpler in construction and lighter in weight.

Still a further object of the invention aims at providing a machine tool of the character described which allows for a better mutual accommodation of the position of the tool magazine to that of the machine stand, and thus, simplifies the accommodation of the tool changer to different arrangements of such components.

Yet a further object of the invention aims at providing a new and improved construction of machine tool which precludes that vibrations, emanating from the tool magazine, will be transmitted to the work spindle, and thus, impair the accuracy of the operation of the machine tool.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
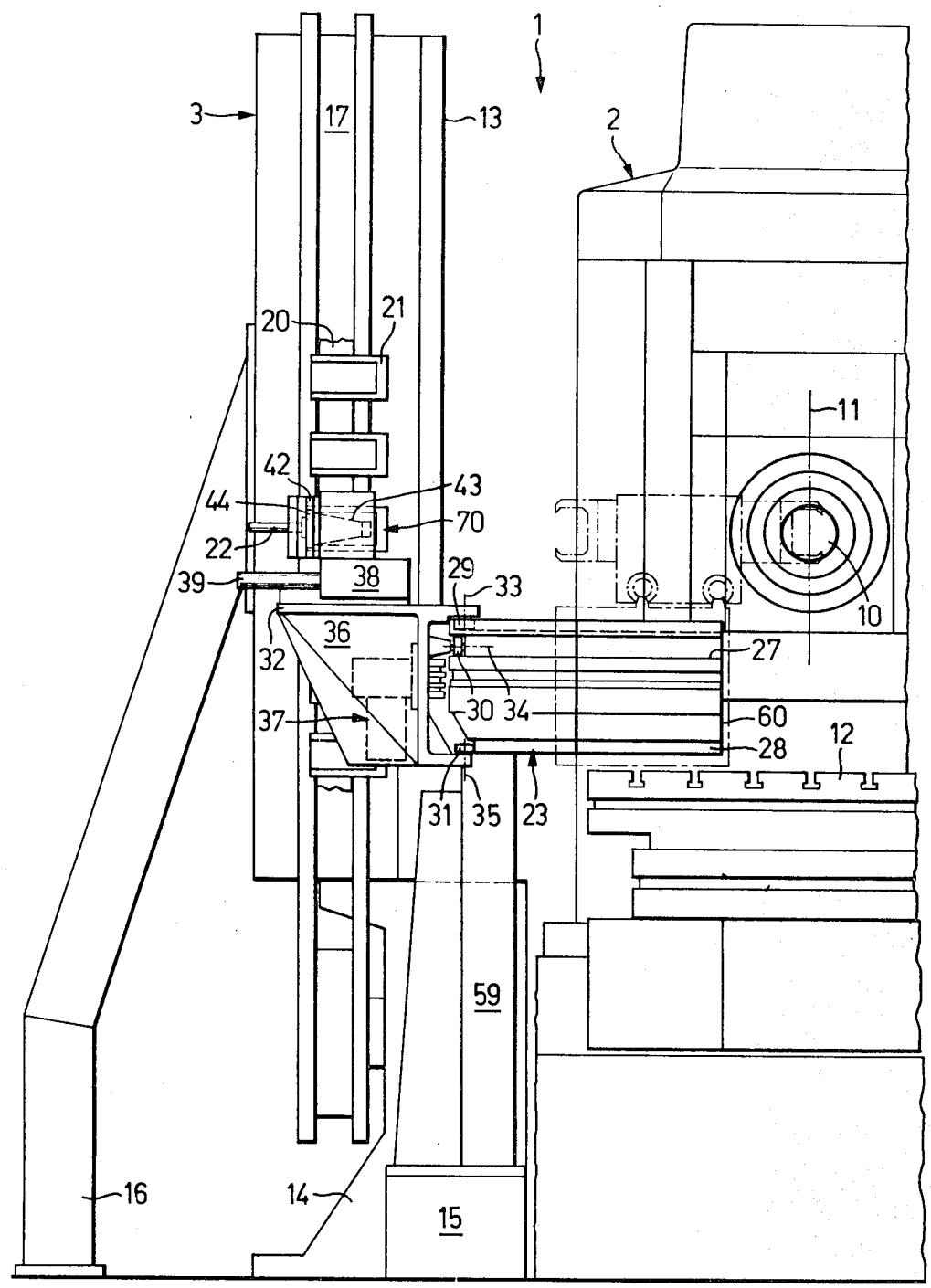
FIG. 1 is a front view illustrating part of a machine tool according to the invention.
Figure 2:
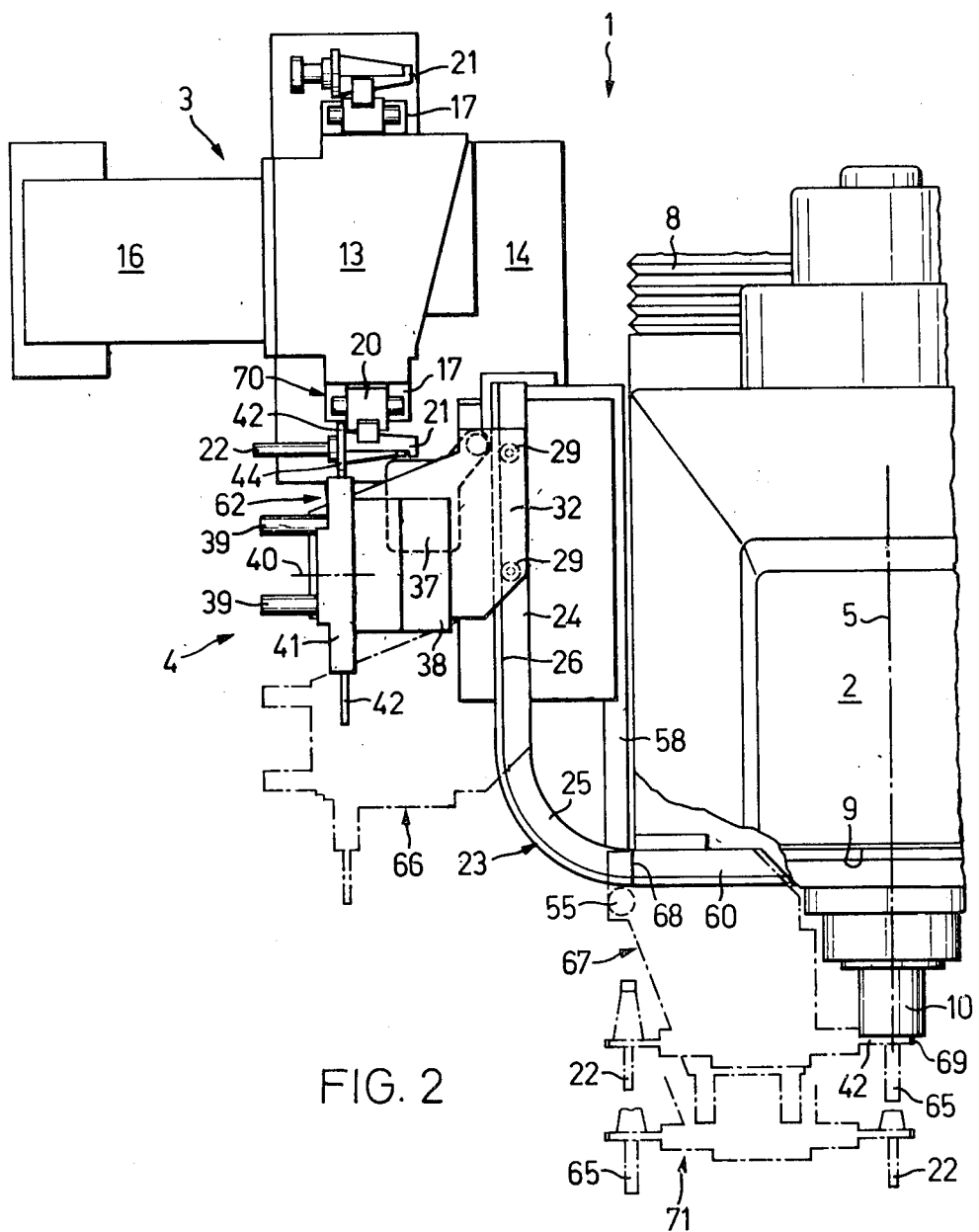
FIG. 2 is a top plan view of the machine tool shown in FIG. 1.

Describing now the drawings, in FIGS. 1 and 2 there is illustrated a machine tool 1 composed of a machine stand 2, a tool magazine 3 and a tool changer 4.

As best seen by referring to FIG. 2, the machine stand 2 is mounted to be movable to-and-fro along a substantially horizontal axis 5, in conventional manner upon guides of a base frame. As a matter of simplifying the illustration the base frame containing the guides has been omitted from the showing of the drawings, because it is covered by a bellows 8 and thus protected against contamination or soiling. At the front side 9 of the machine stand 2 there is arranged a work spindle 10. This work spindle 10 contains a conventional device for receiving and chucking the tools. For instance, this device can be designed especially for receiving tools at whose one end there is provided a cone or conical portion of a certain length and having a predetermined aperture angle. The drive of such work spindle 10 is accomplished equally in conventional manner and is unimportant for understanding the teachings of the instant invention. The work spindle 10 also is arranged to be displaceable along a vertical axis 11, as best seen by referring to FIG. 1.

Also by reverting to FIG. 1 there will be recognized a rotatable and displaceable rotatable table 12 upon which there can be chucked the workpieces. The rotatable or rotary table 12 is arranged forwardly of the machine stand 2 and likewise is mounted and driven in known manner along guides.

The tool magazine 3 consists of a magazine stand 13 which is supported upon a magazine socket or pedestal 14 or the like. A further socket portion 15 likewise constitutes part of the magazine socket or pedestal 14. A brace or support member 16 additionally laterally supports the magazine stand 13. Arranged at the magazine stand 13 is a guide rail 17 for a revolving endless chain 20. This endless chain 20 carries holders 21 for the tools 22.

The endless chain 20 is driven by a standard sprocket wheel or gear which, in turn, is propelled by a suitable drive motor. The components composed of the sprocket wheel, drive motor and the control of the drive motor as well as their arrangement and also their use for tool magazines are well known and therefore need not here be further considered.

As best seen by referring to FIGS. 1 and 2 the tool changer 4, apart from the hereinafter described elements, consists of a rail 23 composed of a linear partial portion 24 and a curved portion or section 25. The rail or rail means 23 is provided at both sides with travel surfaces 26, 27, 28 for the rolls 29, 30 and 31, respectively, of a carriage or slide 32. The rolls or rollers 29 and 31 serve for guiding the carriage 32 in horizontal direction and possess vertical and pairwise coaxially arranged wheel axes 33 and 35. The rolls or rollers 30 serve for the vertical guiding of the carriage 32 upon the rail 23 and therefore possess correspondingly horizontally oriented axes or shafts 34. As to each of the rolls 29, 30, 31, two such rolls are arranged along the carriage 32 which travel upon the related travelling surfaces or tracks 26, 27 and 28.

The carriage 32 consists of a carriage frame 36 at which there are mounted the rolls 29, 30 and 31, and in which there is arranged a drive device 37 and upon which there is located a rotary arm carriage or slide 38.

This rotary arm carriage or slide 38 is attached to the carriage frame 36 by means of two cylinder guides 39 arranged at the carriage frame 36. This allows the rotary arm carriage 38 to perform a displacement movement in horizontal direction upon the carriage frame 36.

Mounted upon the rotary arm carriage 38 is a rotatable arm 41 which can rotate about an axis or shaft 40. At both ends of the rotatable arm 41 there is arranged a respective gripper tong or clamp 42 or equivalent structure which is capable of seizing and retaining or again releasing, as the case may be, a tool 22 at whose collar 44 there is arranged forwardly thereof a cone or conical portion 43. The rotary arm carriage 38 along with the rotatable arm 41 and the gripper clamps or tongs 42 constitutes structure known as such in this art and also can be designed in conventional manner, so that further details thereof need not here be given.

Figure 3:
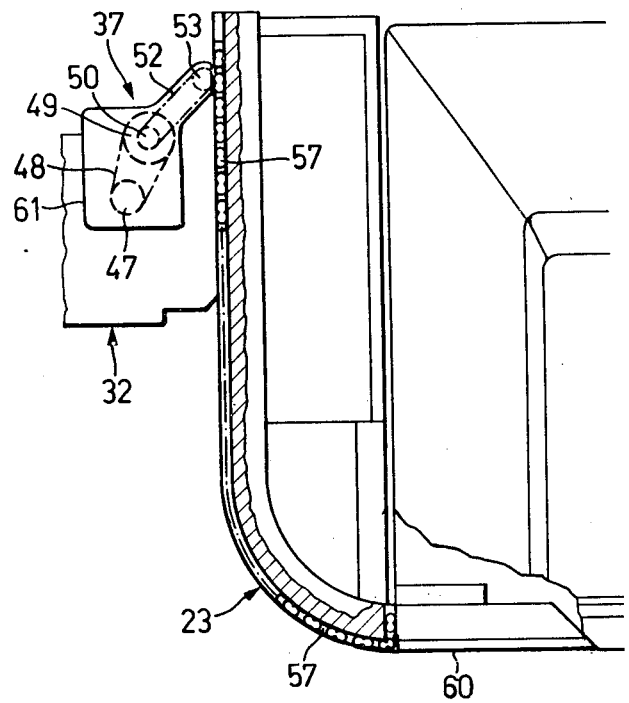
FIG. 3 illustrates on an enlarged scale in relation to FIG. 1, in top plan view part of the machine tool shown in FIG. 1 and illustrated partially in sectional view.
Figure 4:
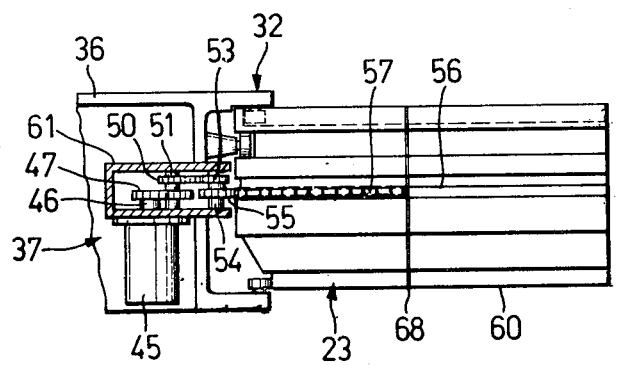
FIG. 4 is a fragmentary front view of part of the arrangement of FIG. 3.

As best seen by referring to FIGS. 3 and 4, the drive device or unit 37 consists of a drive motor 45 which is flanged to a drive housing 61 secured at the carriage frame 36, and by means of a shaft 46 drives a sprocket wheel 47. This sprocket wheel 47 is connected by means of a chain 48 with a further sprocket wheel 49 which is rotatably mounted but fixedly connected with a sprocket wheel 50 of smaller diameter upon a shaft 51. A second chain 52 is trained about the sprocket wheel 50 as well as a further sprocket wheel 53 which is fixedly connected and conjointly seated along with the drive gear 55 upon a shaft 54. Suitable as the drive motor 45, in the embodiment under discussion, is a hydraulic motor. Of course, such tool changer also can be equipped with a drive motor which functions according to a different principle. The rail 23 carries within a groove 56 a chain 57 which extends over the entire length of the rail 23. The drive gear or wheel 55 meshes with the chain 57, so that the carriage or slide 32 can be driven. Of course it is possible to use, instead of the chain 57, also other elements or equivalent structure, such as racks and the like. The drive device 37 as well as the chain 57 collectively form the drive means 37, 57.

The rail 23, as best seen by referring to FIGS. 1 and 2, is supported upon the socket portion 15 by means of a frame 58 and a foot member 59.

An extension element 60, which is separate from the rail 23 and secured at the stand 2 and having the same travel surfaces 26, 27 and 28 for the rolls 29, 30 and 31, constitutes an extension of the rail 23 in the direction of the work spindle 10.

Having now had the benefit of the foregoing description of the machine tool arrangement of the present development its mode of operation will be considered and is as follows:

If a tool 22 is to be exchanged at the tool magazine 3 for a tool 65 in the work spindle 10, then the operations needed for this purpose are carried out approximately in the following manner: Initially, the endless chain 20 is brought into a position, as generally indicated by reference character 70, where the desired tool 22 can be engaged by the gripper clamp 42. During the revolving of the endless chain 20 the carriage or slide 32 is located in its park position 66, which has been indicated in phantom lines in FIG. 2. The endless chain 20 can be moved while the carriage 32 assumes this park position 66 without coming into contact with the gripper clamps or tongs 42 of the rotary arm 41.

If the tool 22 has reached the above-described position 70 which has been shown in FIGS. 1 and 2, then the carriage 32 is brought into its end position 62 operatively associated with the tool magazine 3 and as the same has been shown in full lines in FIG. 2. During such time as the carriage 32 moves into the end position 62 one of the gripper clamps 42 engages the tool 22 at the collar 44. Thereafter the carriage 32 travels into its park position 66. At that location the cone or conical portion 43 of the tool 22 can be cleaned by any suitable conventional cleaning means. At a later point in time the carriage 32 travels into its end position 67 operatively associated with the work spindle 10, this end position 67 having been illustrated in FIG. 2 by chain-dot lines. This presupposes that the machine stand 2 and the work spindle 10 are brought into a certain position as shown in FIG. 2, in which the extension piece or element 60 can form the extension of the rail 23 and the work spindle 10 is located at the height of the gripper clamp 42. In this end or terminal position 67 the carriage 32 bears upon the extension piece or element 60. The drive gear or wheel 55 or equivalent structure, on the other hand, is still in engagement with the chain 57 which only extends up to the rail end 68. During arrival of the carriage 32 at the end position 67 the empty gripper clamp or tong 42 has engaged the collar 69 of the tool 65. The rotary arm carriage 38 now can be displaced into its forward end or terminal position 71, so that the tool 65 can be withdrawn out of the work spindle 10.

In the forward end or terminal position 71 of the rotary arm carriage 38 the rotary arm 41 is rotated through 180°, so that now the tool 22 comes to lie in front of the work spindle 10. The rotary arm carriage 38 need now only be retracted back into its rear terminal or end position and the tool 22 is mounted in the work spindle 10. The carriage 32 now is retracted back into its end position 62, so that the gripper clamp 42 can release the collar 44 of the tool 22 and the tool 65 is placed in a holder 21 of the endless chain 20 provided in the tool magazine 3. Now the carriage or slide 32 returns back into the park position 66 and the tool changer is ready to carry out a further tool change operation.

While there are shown and described present preferred embodiments of the invention, it is to be distinctly understood that the invention is not limited thereto, but may be otherwise variously embodied and practiced within the scope of the following claims. ACCORDINGLY,

What we claim is:
1. A machine tool comprising:
a machine stand for a work spindle;
a work spindle mounted on said machine stand;
a tool magazine arranged separate from the machine stand;
a tool changer positioned to cooperate with the tool magazine;
a carriage provided for said tool changer;
said tool changer being mounted on said carriage;
rail means upon which there is movably mounted said carriage;
drive means provided for said carriage for positively driving said carriage along said rail means;
said rail means being fixedly secured to said tool magazine;
an extension element separate from said rail means for extending said rail means and having a length less than the length of the carriage;
said drive means including a drive element arranged exclusively at said rail means and serving to drive the carriage both along said rail means and also along said extension element;
said extension element being mounted on said machine stand and only possessing travelling surfaces for the carriage;
said rail means having opposed ends;
said drive element extending from one end of said rail means to the opposite end of said rail means;
said opposite end of said rail means confronting said extension element;
a drive gear engaging with said drive element;
a drive motor arranged at said carriage and driving said drive gear;
said carriage being movable into an end position located adjacent said work spindle and in which end position a tool located in the work spindle can be exchanged; and
said carriage in said end position being supported upon said extension element and with said drive gear engaging with said drive element located exclusively at said rail means.
2. The machine tool as defined in claim 1, wherein: said drive element comprises a chain.
3. The machine tool as defined in claim 1, wherein: said carriage is provided with rolls;
said rail means containing travelling surfaces;
said travelling surfaces of said rail means and said extension element being arranged substantially vertically and horizontally for the rolls of said carriage; and
certain of said rolls of said carriage having axes directed substantially horizontally and other of said rolls having axes directed substantially vertically.
4. A machine tool comprising:
a machine stand for a work spindle;
a work spindle mounted on said machine stand;
a tool magazine arranged separate from the machine stand;
a tool changer positioned to cooperate with the tool magazine;
a carriage provided for said tool changer;
said tool changer being mounted on said carriage;
rail means upon which there is movably mounted said carriage;
said rail means being fixedly secured to said tool magazine;
an extension element separate from said rail means for extending said rail means;
said extension element being mounted on said machine stand;
a drive element mounted exclusively at said rail means;
a drive gear engaging with said drive element;
a drive motor which is mounted at said carriage and driving said drive gear;
said carriage assuming an end position in which there can be exchanged a tool in the work spindle; and
said carriage when in said end position being supported upon said extension element and the drive gear remaining in engagement with the drive element at said rail means.

5. The machine tool as defined in claim 4, wherein:
said carriage is provided with rolls;
said rail means and said extension element containing travelling surfaces;
predetermined ones of said travelling surfaces being arranged substantially vertically and the remaining ones of said travelling surfaces being arranged substantially horizontally; and
certain of said rolls of said carriage having axes directed substantially horizontally and other of said rolls having axes directed substantially vertically.

6. A machine tool comprising:
a machine stand for a work spindle;
a work spindle positioned to cooperate with said machine stand;
a tool magazine arranged separate from the machine stand;
a tool changer mounted on the tool magazine;
a carriage provided for said tool changer;
said tool changer being mounted on said carriage;
rail means upon which there is movably mounted said carriage;
said rail means being fixedly secured to said tool magazine;
an extension element separate from said rail means for extending said rail means; and
said extension element being mounted at said machine stand;
said extension element having a length which is shorter than the length of said carriage;
a drive element arranged exclusively at said rail means;
a drive gear engaging with said drive element;
said drive gear being arranged at an end of said carriage which faces away from said work spindle;
a drive motor which is mounted at said carriage and driving said drive gear;
said carriage assuming an end position in which there can be exchanged a tool in the work spindle; and
said carriage when in said end position being supported upon said extension element and the drive gear remaining in engagement with the drive element at said rail means.

7. The machine tool as defined in claim 6, wherein:
said carriage is provided with rolls;
said rail means and said extension element containing travelling surfaces;
predetermined ones of said travelling surfaces being arranged substantially vertically and the remaining ones of said travelling surfaces being arranged substantially horizontally; and
a part of said rolls of said carriage having axes directed substantially horizontally and other of said rolls having axes directed substantially vertically.

* * * * *